United States Patent
Martell et al.

(10) Patent No.: US 10,616,302 B1
(45) Date of Patent: Apr. 7, 2020

(54) MEDIA RELAY (71) Applicant: CSC Holdings, LLC, Bethpage, NY (US)

(72) Inventors: Lawrence Martell, Huntington, NY (US); Brian Sweeney, Oyster Bay, NY (US); James A. Blackley, Oceanside, NY (US); Lena Pavlovskaia, Cupertino, CA (US)

(73) Assignee: CSC Holdings, LLC, Bethpage, NY (US)

( * ) Notice: Subject to any disclaimer, the term of this patent is extended or adjusted under 35 U.S.C. 154(b) by 0 days.

(21) Appl. No.: 16/200,013

(22) Filed: Nov. 26, 2018

Related U.S. Application Data (62) Division of application No. 13/251,753, filed on Oct. 3, 2011, now Pat. No. 10,187,441.

(51) Int. Cl.
H04N 21/235 (2011.01)
H04L 29/06 (2006.01)
H04N 21/436 (2011.01)

(52) U.S. Cl.
CPC ........ *H04L 65/605* (2013.01); *H04L 65/1069* (2013.01); *H04L 65/608* (2013.01); *H04N 21/43615* (2013.01)

(58) Field of Classification Search
CPC ................................................ H04N 21/2552
See application file for complete search history.

(56) References Cited

U.S. PATENT DOCUMENTS

| 7,523,044 | B2 | 4/2009 | Rosenblood |
| 8,341,238 | B2 | 12/2012 | Shivaji-Rao |
| 8,554,923 | B2 | 10/2013 | Lee |
| 8,930,546 | B2 * | 1/2015 | Yoon ................. H04L 29/12528 709/227 |
| 2005/0204393 | A1 | 9/2005 | Bopardikar et al. |
| 2007/0157281 | A1 | 7/2007 | Ellis et al. |
| 2008/0120657 | A1 | 5/2008 | Dong |
| 2009/0260042 | A1 * | 10/2009 | Chiang ............... H04L 12/2801 725/80 |
| 2010/0057929 | A1 * | 3/2010 | Merat ............... H04L 29/12462 709/231 |
| 2010/0094978 | A1 * | 4/2010 | Runeson ........... H04L 29/12367 709/221 |
| 2011/0030013 | A1 | 2/2011 | Diaz Perez |
| 2011/0197236 | A1 | 8/2011 | Rao |
| 2011/0277022 | A1 * | 11/2011 | Weizman .......... H04L 29/12528 726/7 |
| 2012/0042082 | A1 | 2/2012 | Liao |
| 2012/0166593 | A1 * | 6/2012 | Yoon ...................... H04L 61/15 709/219 |

(Continued)

*Primary Examiner* — Mushfikh I Alam
(74) *Attorney, Agent, or Firm* — Sterne, Kessler, Goldstein & Fox P.L.L.C.

(57) ABSTRACT

A method, system, and computer program product for Network Address Translation (NAT) traversal that couples a first device behind a NAT device to a second device is provided. The method includes the steps of receiving a first request from the first device to open a connection with the second device, receiving a second request from the second device to open a connection with the first device, where the second request includes the connection address of the second device, and sending the connection address of the second device to the first device which allows the first device to connect to the second device.

20 Claims, 2 Drawing Sheets (56) References Cited

U.S. PATENT DOCUMENTS

| | | | |
|---|---|---|---|
| 2012/0204217 A1* | 8/2012 | Regis | H04H 20/78 725/116 |
| 2012/0331160 A1* | 12/2012 | Tremblay | H04L 67/28 709/228 |
| 2012/0331499 A1* | 12/2012 | Hagens | H04N 7/141 725/25 |
| 2013/0067544 A1* | 3/2013 | Kwark | H04W 12/08 726/4 |
| 2013/0086619 A1 | 4/2013 | Martell et al. | |
| 2013/0138822 A1 | 5/2013 | Hu et al. | |
| 2013/0315249 A1 | 11/2013 | Tanimoto | |
| 2017/0111314 A1 | 4/2017 | Lohner | |

* cited by examiner

FIG. 2

MEDIA RELAY

CROSS-REFERENCE TO RELATED APPLICATIONS

This application is a divisional of U.S. patent application Ser. No. 13/251,753, filed Oct. 3, 2011, now U.S. Pat. No. 10,187,441, which is incorporated herein by reference in its entirety.

BACKGROUND OF THE INVENTION

Field of the Invention

The invention generally relates to the display of the output of a computational device, including the display of internet-based media, on a television.

Background Art

Users wishing to display the output of a computational device, such as a personal computer or laptop, on a television screen typically cannot do so without physically connecting the two via a display cable. Typically, there are multiple impediments to doing such. Users must first acquire a suitable cable. They must possess sufficient familiarity with their computational device and their television to acquire the correct cable, connect it correctly to both devices, and to be able to switch inputs on the television, as needed. If the computational device is already connected to a display, there may not be a suitable output connector available. If the television is already connected to multiple signal sources, there may not a suitable input connector available.

What is needed is a method and a system to overcome these limitations, enabling users to display the output of computational devices, including internet-based media, on their televisions, while avoiding the cost and complexity of existing systems and methods.

BRIEF DESCRIPTION OF THE DRAWINGS/FIGURES

The accompanying drawings, which are included to provide a further understanding of the invention and are incorporated in and constitute a part of this specification, illustrate embodiments of the invention and together with the description serve to explain the principles of the invention. In the drawings.

The present invention will now be described with reference to the accompanying drawings. In the drawings, like reference numbers may indicate identical or functionally similar elements.

DETAILED DESCRIPTION OF THE INVENTION

Embodiments presented herein allow a source device to relay media through a media server to a display device. In an example, the source device and the display device are located in the same premises and the media server is located remote to the source device and the display device. In another example, the source device and the display device are remotely located from each other and from the media server. "Media" as referred to herein may be streaming media such as video or audio. However, it is to be appreciated that "media" may encompass any item on a source device including but not limited to images and documents of any format.

In an example, the source device may be located behind a network address translation (NAT) device. In another example both source device and the media server may be located behind a NAT device. It is to be appreciated that either the source device, the media server or both may be located behind a NAT device. It is also to be appreciated that in embodiments, either the source device or the media server or neither may be located behind a NAT device. A NAT device, may be, for example, a router, firewall or other computational device. A NAT device converts private Internet Protocol (IP) addresses of a client computational device (such as the source device or media server) that is behind it on an internal private network to one or more public IP addresses for the Internet. It may change packet headers to the converted IP address and keep track of the headers via internal tables. When packets come back from the Internet, the NAT device may use the tables to perform a reverse conversion to the IP address of the client computational device. NAT allows a single device, such as a router, to act as agent between the Internet (or "public network") and a local (or "private") network. In an embodiment, media is transmitted by the source device via the Internet and is received by the display device via a cable television network. The media server may be located at a cable television headend. The display device may be a television (TV). However, other display devices are contemplated. The computational device may be a user's personal computational device such as a personal computer or a laptop.

In an embodiment presented herein, media on a user's personal computational device can be viewed via the cable television network on the user's TV without directly connecting the computational device to the TV. For example, a user may launch an application on their computational device which streams the desired media to a media server that may be located at a television cable headend remote from the user's premises. The user may then tune to a particular television channel, such as a channel on a cable set-top box, dedicated for media relay. The cable television headend may transcode the received media and transmit the media via a cable television network to the user's set top box. The set top box displays the received media on the user's TV.

Embodiments presented herein further allow communication with systems behind a NAT, without using traditional NAT traversal techniques such as Transmission Control Protocol (TCP) hole punching, Universal Plug and Play (UPnP), port forwarding or a proxy server. Traditional NAT traversal techniques may require a manual setup step by a user to create a port-forwarding entry in the user's NAT to enable outside access to the streaming source device. This port-forwarding has two drawbacks. First, because of the manual setup by the user it is a potential source of failure resulting in customer support requests due to the level of complexity and knowledge required for the manual setup. Second, it is a potential security issue because it creates an outside accessible port to the source device that could be hacked by a malicious third party client. Simple solutions such as a proxy server, TCP hole-punching or UPnP are either not scalable or are not without problems on the client side.

Figure 1:
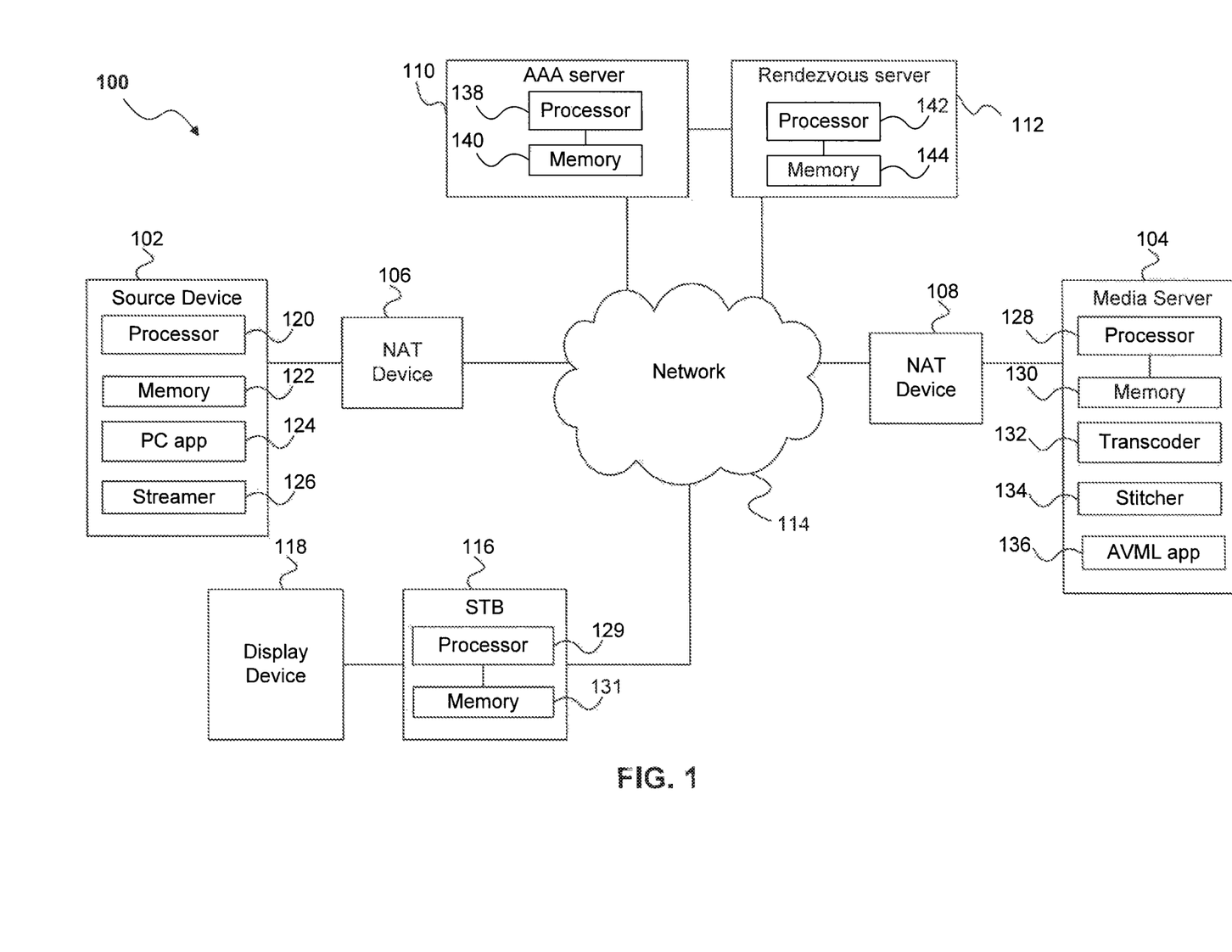
FIG. 1 illustrates an example media relay system according to an embodiment of the invention.

FIG. 1 illustrates an example media relay system 100 according to an embodiment of the invention.

Media relay system 100 includes a source device 102, media server 104, authorization server 110, rendezvous server 112, set top box 116, and display device 118. In an example, media server 104 may be located behind a NAT device 108 and source device 102 may be located behind a NAT device 106. In another example, only media server 104 may be located behind NAT device 108. NAT device 106 and NAT device 108, may be, for example, routers. Source device 102, set top box 116, media server 104, authorization server 110 and rendezvous server 112 are coupled to a network 114.

In an embodiment, source device 102 transmits media to media server 104 via a real time streaming protocol (RTSP) and media server 104 relays media to set top box 116 over a cable television network via a QAM- (quadrature amplitude modulation) modulated MPEG-2 transport stream. In another embodiment, source device 102 transmits media to media server 104 via a real time protocol (RTP). Although the embodiments presented herein may use RTSP or RTP, it is to be appreciated that other protocols may be used to transmit and receive media. In an embodiment, network 114 may include a hybrid fiber coaxial (HFC) cable television network or a fiber to the premises (FTTP) network. In an embodiment, network 114 may also include the Internet. It is to be appreciated that the type of network is a design choice, and embodiments of the invention presented herein are not dependent on the type of network used.

Source device 102 may include a processor 120 coupled to a memory 122. Processor 120 may perform the functions described therein as being performed by source device 102 based on instructions stored in memory 122. Source device 102 may also include a personal computation application (PC app) 124 and a streamer 126. Functions performed by PC app 124 and streamer 126 are described in further detail below with respect to FIG. 2. In an embodiment, PC app 124 and streamer 126 are embodied in hardware. In another embodiment, PC app 124 and streamer 126 may be software that run on processor 120 based on instructions stored in memory 122. Display device 118 may be, for example, a TV or any other form of display device, such as, an Apple iPad™ or a mobile communication device, such as a smart phone.

Set top box 116 may include a processor 129 coupled to a memory 131. Processor 129 may perform the functions described herein as being performed by set top box 116 based on instructions stored in memory 131.

Media server 104 may include a processor 128 coupled to a memory 130. Steps described herein are being performed by media server 104 may be performed by processor 128 based on instructions stored in memory 130. Media server 104 may also include a transcoder 132, a stitcher 134, an Active Video Markup Language application (AVML app) 136. Embodiments presented herein may use AVML, but it is to be appreciated that other languages or protocols may be used to implement the functions performed by the AVML app 136. In an example, transcoder 132, stitcher 134 and AVML app 136 may be implemented solely in hardware. In another embodiment, transcoder 132, stitcher 134 and AVML app 136 may be implemented in hardware, software, firmware or any combination thereof. In another example, transcoder 132, stitcher 134 and AVML app 136 may be implemented as software running on processor 128 based on instructions stored in memory 130.

Authentication, authorization and accounting server (AAA) 110 may include a processor 138 coupled to a memory 140. The functions described herein as being performed by authorization server 110 may be performed by a processor 138 based on instructions stored in memory 140. Rendezvous server 112 may include a processor 142 coupled to a memory 144. The functions performed by rendezvous server 112 as described herein may be performed by processor 142 based on instructions stored in memory 144.

According to an embodiment of the invention, to view media stored or streamed by source device 102 on display device 118, a user initiates the PC application 124. In response to the user input, source device 102 authenticates itself with AAA server 110. In response to being authenticated by AAA server, source device 102, opens a transmission control protocol (TCP) session with rendezvous server 112. In an embodiment, source device 102 may use AAA server to authenticate itself to rendezvous server 112.

To view the media streamed by source device 102 on display device 118, the user tunes to a dedicated media relay channel using set top box 116. In response to the user tuning to the media relay channel, the set top box 116 transmits a signal to media server 104 to open a TCP connection with rendezvous server 112. Rendezvous server 112, receives a signal from media server 104 that indicates the media server 104 is ready to receive media from source device 102. Upon receiving the signal from media server 104, rendezvous server 112 transmits a connection address for media server 104 to source device 102. Rendezvous server also notifies the media server 104 of a connection address for source device 102. In an example, the connection address is an Internet Protocol (IP) address and a port number. It is to be appreciated that the type of connection address and protocol used is a design choice. After both the source device 102 and the media server 104 have been provided each other's connection address, rendezvous server 112 closes the connection with the source device 102 and media server 104 closes the connection with rendezvous server 112.

Source device 102, based on the connection address for media server 104, connects to media server 104 and requests the start of an RTSP session by media server 104, to stream media to media server 104. In an alternate embodiment, the source device 102 may start the RTSP session. In response to the request, media server 104 grants the source device 102 permission to transmit media to the media server 104. Streamer 126 streams media to the media server 104. The streamed media is relayed by media server to set top box 116. The relayed media may then be viewed on the on the media relay channel via display device 118. The streamed media may be optionally transcoded by transcoder 132 prior to transmission to set top box 116. Alternatively, media may be transcoded by streamer 126 prior to streaming the media to media server 104. The steps performed by source device 102, authorization 110, rendezvous server 112, media server 104, and set top box 116 are further described below with respect to FIG. 2

Figure 2:
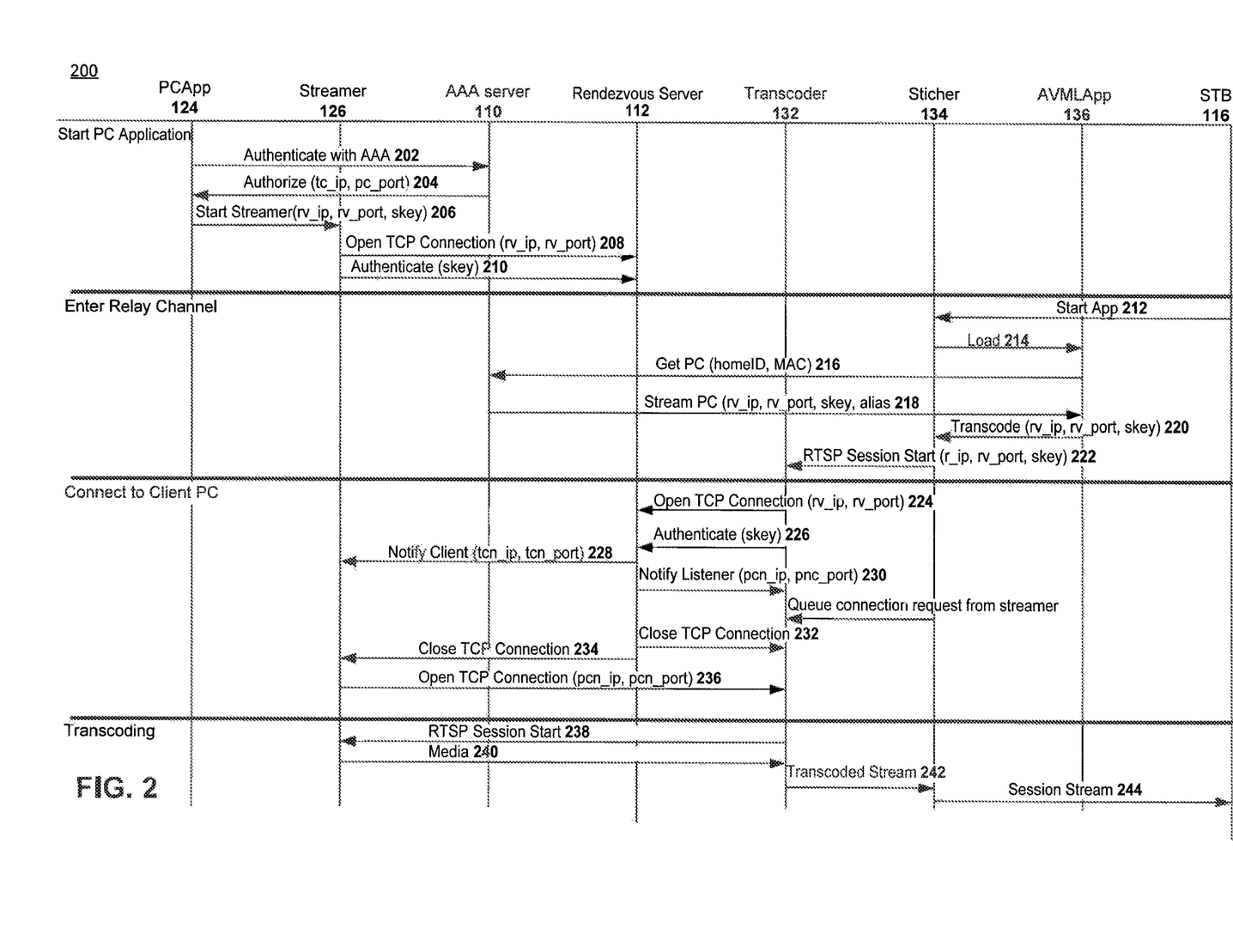
FIG. 2 illustrates an example flow diagram that illustrates a media relay process according to an embodiment of the invention.

FIG. 2 illustrates an example flow diagram 200 that illustrates a media relay process according to an embodiment of the invention.

PC application 124 authenticates source device 102 with AAA server 110 using authentication message 202. It is to be appreciated that any type of authentication may be used including but not limited to Rivest-Shamir-Adleman (RSA), Digital Signature Algorithm (DSA) and Secure Hash Algorithm (SHA).

AAA server 110 sends an authorization message 204 to source device 102. The authorization message 204 may include a Transmission Control Protocol (TCP) address (tcp_ip) and a port address (pc_port).

In response to receiving authorization message 204 from AAA server 110, PC application 124 sends a start streamer command 206 to streamer 126 with an IP address (rv_ip) for rendezvous server 112, a port address (rv_port) for rendezvous server 112 and a session key (skey).

In response to the start streamer command 206, streamer 126 opens a TCP connection with rendezvous server 112 using an open TCP connection command 208.

Streamer 126 authenticates itself with rendezvous server 112 using an authenticate command 210 that includes the session key (skey). Upon successful authentication, rendezvous server 112 open a TCP connection with streamer 126 and keeps the TCP connection with streamer 126 open.

In response to a user tuning to a media relay channel, set top box 116 sends a start application command 212 to stitcher 134 that is located in media server 104.

In response to the start application command 212, stitcher 134 sends a load command 214 to AVML application 136. In response to the load command 214, AVML application 136 sends a Get PC command 216 to AAA server 110. The Get PC command 216 includes a Media Access Control (MAC) address of the set top box 116 and a home ID that identifies the set top box 116 to AAA server 110.

In response to the Get PC command 216, AAA server 110 transmits a stream PC command 218 to AVML application 136. The steam PC command 18 may include the IP address of the rendezvous server 112 (rv_ip), the port address of the rendezvous server 112 (rv_port), the session key (skey) and an alias.

In response to receiving the steam PC command 218, AVML App 136 transmits a transcode command 220 to stitcher 134 that includes the rv_ip, rv_port and the skey. In response to a transcode command 220, stitcher 134 sends a RTSP session start command 222 to transcoder 132 that includes the rv_ip, rv_port and the skey.

Transcoder 132 sends an open TCP connection command 224 to rendezvous server based on rv_ip and rv_port which opens a TCP connection with the rendezvous server 112. Transcoder 132 also authenticates itself to rendezvous server 112 using the authenticate command 226 and session key (skey) received from stitcher 134.

In response to opening the TCP connection with transcoder 132, rendezvous server sends a notify client command 228 to streamer 126. The notify client command 228 includes an IP address (tcn_ip) of transcoder 132 and a port address (tcn_port) of transcoder 132. Rendezvous server 112 also transmits a notify listener command 230 to transcoder 132 that includes an IP address (pcn_ip) of media source 102 and a port address (pcn_port) of the media source 102. Based on the notify listener command 230, transcoder places the source device 102 in a queue. The queue may be a first in first out (FIFO) queue or it may be a queue based on programmable priority levels.

By providing media source 102 with the IP address and port address of transcoder 132 and by providing the IP address and port address of source device 102, rendezvous server 112 bridges source device 102 and media server 104 which may be behind NAT device 106 and NAT device 108. This allow source device 102 to directly connect to media server 104 without any further assistance from rendezvous server 112. Rendezvous server 112 closes the TCP connection with streamer 126 using command 234 and closes the TCP connection with transcoder 132 using command 236.

Streamer 126 sends an open TCP connection command 236 to transcoder 132 with pcn_ip and pcn_port as parameters. When it is the turn of source device 102 in the queue, transcoder 132 transmits a RTSP session start command 238 that commands streamer 126 to stream media to transcoder 132. In response to receiving the RTSP session start command 238, streamer 126 streams media 240 to transcoder 132. Transcoder 132 transcodes media 240 and sends a transcoded stream 242 to stitcher 134. Stitcher 134 transmits a session stream 244 through network 114 (that may include a cable television network) to set top box 116 for display on the display device 118.

Thus, embodiments of the invention allow a user to relay media form a source device 102 to a display device 118 via a media server 104. Furthermore, in the embodiments presented above, rendezvous server 112 acts as a intermediary or a bridge to couple source device 102 to media server 104, one or both of which may be behind a NAT device. Typical NAT traversal techniques require an intermediary server to be active throughout the communication process thereby creating significant delays due to bottlenecks created by the intermediary server. In contrast to typical NAT traversal techniques, there is no further intervention by rendezvous server 112 once it has facilitated a connection between source device 102 to media server 104.

Example Implementation

An example implementation of the media relay system 100 is described below. It is to be appreciated that the implementation is for example purposes only and does not limit the scope of the embodiments presented herein.

In an example, a main communication element from AAA server 10 to AVML

APP 136 is a "pcinfo" XML document. This XML structure is augmented with an additional element called "rendezvous" that includes the IP address and port address of the rendezvous server as attributes. A "pc" element may include an additional attribute called "skey" that transmits the session key that is used for match making in the rendezvous server 112. This attribute is mutual exclusive with an "ip address"/"port" attribute pair that is used, if no reversed connect is required. Example XML code is provided below:

```
<?xml version="1.0" encoding="UTF-8"?>
<pcinfo>
    <status>SUCCESS</status>
    <rendezvous ipaddress="123.456.08.15" port="4953"/>
    <pcs>
        <pc    alias="Adams    PC"    streaming="true"
            skey="ab34cdEF043rgq"/>
        <pc         alias="Den"         streaming="false"
            skey="wq334dfgh2345w2"/>
        <pc         alias="Office"        streaming="false"
            skey="oaIHG43HjIUwe23"/>
    </pcs>
</pcinfo>
```

Optional Universal Resource Locator (URL) code is provided below:

```
<?xml version="1.0" encoding="UTF-8"?>
<pcinfo>
    <status>SUCCESS<status>
    <pcs>
        <pc alias="Adams PC" streaming="true"url="rdvs://
            123.456.08.15/ab34cdEF043rgq"/>
        <pc    alias="Den"    streaming="false"url="rdvs://
            123.456.08.15/wq334dfgh2345w2"/>
        <pc   alias="Office"   streaming="false"url="rdvs://
            123.456.08.15/oaIHG43HjIUwe23"/>
    </pcs>
</pcinfo>
```

In an example, the rendezvous server 112 has to send keep-alive messages to the AAA server 110 which maintains a list of active rendezvous server 112. These messages have to include three data elements: (1) a public IP address and port that has to be used by streamer 126; (2) NAT IP address and port for NAT device 108 that will be used by the transcoder 132; and (3) A site identification that creates an association between a source device 102 and rendezvous server 112.

In an example, one rendezvous server is used for all sites and it has a single IP address that is available for both the source device 102 and the transcoder 132.

The AAA server 110 may verify the IP of the source device 102 based on a pool of valid IP addresses, to avoid accepting false keep-alive messages from malicious third parties that might result in invalid entries in rendezvous server 112.

In an example rendezvous server 112 is not behind NAT device 108 and may use the URL:

GET/rdvskeepalive?siteid=1234abcdef3241 HTTP/1.0

Example Stitcher to Transcoder Communication

The stitcher 134 may provide the IP address and port of source device 102 to transcoder 123 as media resource information. The rendezvous server initiated process sends the rendezvous server IP address and port address as well as the session key to the transcoder 132. This can be implemented using a combined "rdvs://" URL scheme instead of a "rtsp://" URL. The transcoder can then derive the connection mode from the URL protocol prefix.

Example PC-App to Streamer Communication

The PC-App 124 provides all required configuration values to the streamer 126 as command line arguments. The additional information required for the reversed connection process is thus provided as additional command line arguments. Some arguments are not used in the case of a rendezvous server 112 initiated connection such as:

(1) listen_port—the port the streamer 126 should listen for incoming streaming connections on. This argument is not needed in case of a rendezvous server 112 initiated connection because it is derived from the TCP connection to the rendezvous server 112.

(2) connect_url—The rendezvous server URL including the session key using the "rdvs://" protocol prefix.

The streamer 126 can decide, based on the presence of a connect URL, whether to expose a port directly or negotiate a connection via the rendezvous server 112. The validate message might not be needed in case of a rendezvous initiated connection.

Example Rendezvous Server Protocol

The rendezvous server 112 may use a simple text based protocol that includes the following messages:

Challenge(challengeKey)

Authenticate(authenticateKey, sessionKey [publicIP], [publicPort])

Notify (peerNATIP, peerNATPort)

The challenge message is sent by the rendezvous server 112 to a connecting source device 102 and may include a partially random challenge key that is encrypted with the server key of an RSA key pair. This key is decrypted and re-encrypted by the client (streamer 126 or transcoder 132) using the other key of an RSA key pair. The source device 102 may verify the validity of a non-random part of the challenge key. This re-encrypted key may be sent back by the client as an authenticate key, together with a session key that is used for match making. The rendezvous server 112 uses its key of the RSA key pair to verify the authenticity of source device 102 using the original challenge key and the authenticate key. If it considers the source device 102 to be valid, it decrypts the session key and then attempts to find the peer of this connection in its session dictionary. If this is the first peer, it stores this connection into the session dictionary.

In another example, a less complex authentication procedure may use a salted SHA1 hash. The challenge key is a random number/string generated by the rendezvous server. The response key is the SHA1 hash generated from this random number with a pre-shared fix salt appended to this key.

Rendezvous server 112 may notify both source device 102 and media server 104 when a match is found by sending a notify message, that includes the public IP address and public port number of the opposite NATs. The communication from transcoder 132 to rendezvous server 112 could be as follows:

T>R open connection
R>T CHALLENGE LF CK=<challengeKey>LF EOT
T>R AUTHENTICATE LF AK=<authenticateKey>LF SK=<sessionKey>LF [IP=<publicIP>LF] PORT=<publicPort>LF EOT
R>T NOTIFY LF IP=<clientNATIP>LF PORT=<clientNATPort>LF EOT
T close connection The public IP address is not required if the same IP is used for inbound traffic that is used to connect to the rendezvous server. Streamer 126 does not need to send its public IP and port since it can be derived from the connection. An example connection message is as follows:

T>R open connection
R>T CHALLENGE LF CK=<challengeKey>LF EOT
T>R AUTHENTICATE LF AK=<authenticateKey>LF SK=<sessionKey>LF EOT
R>T NOTIFY LF IP=<publicIP>LF PORT=<publicPort>LF EOT
T close connection The "challengeKey" and "authenticateKey" may be base 64 encoded binary keys, the "sessionKey" could be encrypted with a decrypted "challengeKey" which is available to rendezvous server 112, streamer 126 and transcoder 132.

Example Security Provisions

To prevent overload or crash of rendezvous server 112, a third party attack such as a Denial of Service (DOS) or an attempt to compromise the rendezvous server 112 and/or source device 102, multiple rendezvous servers 112 may be implemented in a cluster format. In an example, the cluster may include AAA server 110. AAA server 110 provides the IP address of the rendezvous server 112 to both source device 102 and media server 104 and may perform a round robin mechanism when selecting a rendezvous server 112. Rendezvous servers 112 may send keep-alive messages to the AAA server 110 in fixed time distances. If a keep-alive message is not be received by the AAA server 110 after three such intervals, the rendezvous server 112 would be considered dead and taken off the list.

A source device 102 that is unable to communicate with its rendezvous server 112 may either fail with a retry option (and thus getting a fresh rendezvous server 112) or a sorted list of rendezvous servers 112 may be used instead of a single one, giving the source device 102 an option for automatic retry.

The rendezvous server 112 has to keep a TCP connection from source device 102 alive until media server 104 successfully connects. This may consume valuable resources such as ephemeral sockets. Clustering over several physical or virtual machines reduces the risk of running out of resources. A watchdog timer may be used to cancel sessions that wait for an extended time for their peer, e.g. the customer starts the service on the source device 102 but fails to start tune to a media relay channel using STB 116. The watchdog time may cover a typical delay between start of PC App 124 and start of AVML app 136. Considering that there are 30,000 ephemeral sockets on a typical server and a timeout value of 15 minutes, one server could handle a connection rate of approximately 33 session setups per second, if all connections time out. With an average delay of 5 minutes, one server would achieve approximately 100 session setups per second.

The most important defense against a denial of service attack is an early termination of an attacking connection. This has two major requirements, first detecting the attacking connection attempt and second doing this quickly. The use of a challenge and authentication key may allow rendezvous server 112 to detect unauthorized requests. To do this quickly rendezvous server 112 may use a smaller watchdog timer for the period between the challenge-request and authentication-response than the normal session timeout. Another option would be the use of signing the session keys by AAA server 110. A concatenation of the source device 102 public IP address (available to AAA server 110 through a TCP connection) and the session key could be signed with the private key of the AAA server 110. The rendezvous server 112 could then validate the request of the streamer by verifying the signature with the public key.

The transcoder 132 may know an IP address (but not the port) of the source device 102 through notification by the rendezvous server 112, and is therefore able to limit the range of potential malicious attackers early, or deny it before data is received and interpreted.

The transcoder 132 may keep a listening port open that accepts the incoming stream connections and knows the public IP address and port pair (or port only, if it is a 1:1 port mapping NAT forward and the rendezvous server 112 is outside of NAT device 108) that this port will be represented in the open internet. This acceptor is global to the transcoder process, thus implemented as a singleton, and maintains a dictionary of expected connections. The rendezvous handshaking sequence will insert the session key or the public IP address of the expected streamer 126 into this dictionary, and wait for the connection to happen. It is not possible to wait for the incoming connection directly because several connection attempts from different streamers may be pending at the same time. Therefore it is necessary to maintain a dictionary of pending connections.

Streamer

The streamer 126 may use an instance of an RTSP Server which uses an Tcp Acceptor to open a listening port. Assuming that there is always only one connection to this RTSP Server active at any time, it is possible to derive from the RTSP Server and replace the acceptor related connection with a direct connect call after a synchronous connect and communication with the rendezvous server. The RTSP Server receives an input parameter "struct" that could transfer the rendezvous server address and the session key.

Example AAA Server

The AAA server 110 may send an XML file to the PC application 124 and AVML application 136 that includes an IP address of rendezvous server 112 and a one-time session key. AAA server 110 may maintain a list of active rendezvous servers 112 per site based on the received keep-alive messaged.

Example Rendezvous Server

The rendezvous server 112 may run on Linux as well as Windows™, because the physical server has not been determined yet and may have to be shared with other services. The services provided by the rendezvous server 112 may include: (1) announce availability to AAA server 110 using a keep alive-message; (2) accept incoming connections from streamer 126 and transcoder 132; (3) provide challenge keys and validate response keys; (4) store pending connections in dictionary; (5) match connections using the dictionary; and (6) provide response to participating source device 102.

Rendezvous Server Client Protocol Handler

A rendezvous server protocol is used by the streamer 126 and the transcoder 132. The implementation is based on a ucl::ConnectionPoint/ucl::Protocol class family. Each message ends with an Embedded Open Type (EOT) character that can be used to split the incoming data stream into individual messages.

Embodiments presented herein, or portions thereof, can be implemented in hardware, firmware, software, and/or combinations thereof. The embodiments presented herein apply to any communication system that utilizes packets for data transmission.

The representative media relay functions described herein can be implemented using one or more of computer processors, such as one or more of processors 120, 129, 138, 142 and 128, computer logic, application specific circuits (ASIC), digital signal processors, etc., or any combination thereof, as will be understood by those skilled in the arts based on the discussion given herein. Accordingly, any processor that performs the functions described herein is within the scope and spirit of the embodiments presented herein.

Further, the media relay functions described herein could be embodied by computer program instructions that are executed by a computer processor, for example one or more of processor 120, 129, 138, 142 and 128, or any one of the hardware devices listed above. The computer program instructions cause the processor to perform the instructions described herein. The computer program instructions (e.g. software) can be stored in a computer usable medium, computer program medium, or any storage medium that can be accessed by a computer or processor. Such media include a memory device, such as memory 122, 140, 144, 131 and 130, a RAM or ROM, or other type of computer storage medium such as a computer disk or CD ROM, or the equivalent. Accordingly, any computer storage medium having computer program code that cause a processor to perform the functions described herein are within the scope and spirit of the embodiments presented herein.

CONCLUSION

While various embodiments have been described above, it should be understood that they have been presented by way of example, and not limitation. It will be apparent to persons skilled in the relevant art that various changes in form and detail can be made therein without departing from the spirit and scope of the embodiments presented herein.

The embodiments presented herein have been described above with the aid of functional building blocks and method steps illustrating the performance of specified functions and relationships thereof. The boundaries of these functional building blocks and method steps have been arbitrarily defined herein for the convenience of the description. Alternate boundaries can be defined so long as the specified functions and relationships thereof are appropriately performed. Any such alternate boundaries are thus within the scope and spirit of the claimed embodiments. One skilled in the art will recognize that these functional building blocks can be implemented by discrete components, application specific integrated circuits, processors executing appropriate software and the like or any combination thereof. Thus, the breadth and scope of the present embodiments should not be limited by any of the above-described exemplary embodiments, but should be defined only in accordance with the following claims and their equivalents.

What is claimed is:

1. A method for Network Address Translation (NAT) traversal that couples a first device behind a NAT device to a second device, the first device having a private connection address that is not accessible by the second device, the method comprising:
   receiving, by a rendezvous server, a first request from the NAT device to open a first connection between the first device and the rendezvous server, wherein the first request includes a public connection address of the first device, and wherein the private connection address of the first device has been converted to the public connection address of the first device;
   receiving, by the rendezvous server, a second request from the second device to open a second connection with the rendezvous server, the second request including a public connection address of the second device;
   sending, by the rendezvous server, the public connection address of the first device to the second device over the second connection and the public connection address of the second device to the NAT device over the first connection to allow the second device to connect to the first device using the public connection address of the first device; and
   closing, by the rendezvous server, the first connection and the second connection in response to sending the public connection address of the first device and the public connection address of the second device.

2. The method of claim 1, wherein the second device is behind a second NAT device,
   wherein the second device has a second private connection address that is not accessible by the first device, and
   wherein the second private connection address of the second device is converted to the public connection address of the second device.

3. The method of claim 1, wherein the receiving the first request comprises:
   receiving the first request from the first device to open a first Transmission Control Protocol (TCP) connection,
   wherein the public connection address of the first device includes an Internet Protocol (IP) address of the first device and a port address of the first device,
   wherein the receiving the second request comprises:
      receiving the second request from the second device to open a second TCP connection, and
      wherein the public connection address of the second device includes an IP address of the second device and a port address of the second device.

4. The method of claim 3, further comprising:
   prior to the sending, sending a message to the second device with the IP address of the first device and the port address of the first device to indicate the first device has been notified to connect to the second device; and
   wherein the closing comprises:
      closing the first TCP connection and the second TCP connection to the first device and the second device, respectively, and
   wherein the second device connects to the first device using the IP address of the second device and the port address of the second device.

5. The method of claim 1, wherein the first device comprises a computational device including a personal computer, laptop or media player device.

6. The method of claim 1, wherein the second device comprises a media server at a cable television headend.

7. The method of claim 1, further comprising:
   authenticating the first device prior to receiving the first request.

8. The method of claim 1, wherein the receiving the second request comprises:
   receiving the second request in response to receiving a signal received from a set-top box.

9. A system for Network Address Translation (NAT) traversal that couples a first device behind a NAT server to a second device, the first device having a private connection address that is not accessible by the second device, the system comprising:
   a memory that stores instructions; and
   a processor configured to execute the instructions, the instructions, when executed by the processor, configuring the processor to:
      receive a first request from the NAT device to open a first connection between the first device and a rendezvous server, wherein the first request includes a public connection address of the first device, and wherein the private connection address of the first device has been converted to the public connection address of the first device,
      receive a second request from the second device to open a second connection with the rendezvous server, the second request including a public connection address of the second device,
      send the public connection address of the first device to the second device over the second connection and the public connection address of the second device to the NAT device over the first connection to allow the second device to connect to the first device using the public connection address of the first device, and
      close the first connection and the second connection in response to sending the public connection address of the first device and the public connection address of the second device.

10. The system of claim 9, wherein the second device is behind a second NAT server,
    wherein the second device has a second private connection address that is not accessible by the first device, and
    wherein the second private connection address of the second device is converted to the public connection address of the second device.

11. The system of claim 9, wherein the first connection comprises a first Transmission Control Protocol (TCP) connection,
    wherein the public connection address of the first device includes an Internet Protocol (IP) address of the first device and a port address of the first device,
    wherein the second connection comprises a second TCP connection, and
    wherein the public connection address of the second device includes an IP address of the second device and a port address of the second device.

12. The system of claim 11, wherein the instructions, when executed by the processor, further configure the processor to:
 prior to sending the public connection address of the second device, send a message to the second device with the IP address of the first device and the port address of the first device, wherein the message indicates that the first device has been notified to connect to the second device; and
 wherein the instructions, when executed by the processor, configure the processor to close the first TCP connection and the second TCP connection to the first device and the second device, respectively, and
 wherein the second device connects to the first device using the IP address of the second device and the port address of the second device.

13. The system of claim 9, wherein the first device comprises a computational device including one of a personal computer, laptop or media player device.

14. The system of claim 9, wherein the second device comprises a media server at a cable television headend.

15. The system of claim 9, wherein the memory stores further instructions that when executed by the processor further cause the processor to authenticate the first device.

16. The system of claim 9, wherein the instructions, when executed by the processor, configure the processor to receive the second request to open the second connection with the first device in response to a signal received from a set-top box.

17. A non-transitory computer-readable medium having stored thereon computer executable instructions that, when executed by a computing device, cause the computing device to perform operations, the operations comprising:
 receiving a first request from a Network Address Translation (NAT) device to open a first connection between a first device and a rendezvous server, the first device having a private connection address that is not accessible by the second device, wherein the first request includes a public connection address of the first device, and wherein the private connection address of the first device has been converted to the public connection address of the first device;
 receiving a second request from the second device to open a second connection with the rendezvous server, the second request including a public connection address of the second device;
 sending the public connection address of the first device to the second device over the second connection and the public connection address of the second device to the NAT device over the first connection to allow the second device to connect to the first device using the public connection address of the first device; and
 closing the first connection and the second connection in response to sending the public connection address of the first device and the public connection address of the second device.

18. The non-transitory computer-readable medium of claim 17, wherein the second device is behind a second NAT device,
 wherein the second device has a second private connection address that is not accessible by the first device, and
 wherein the second private connection address of the second device is converted to the public connection address of the second device.

19. The non-transitory computer-readable medium of claim 17, wherein the receiving the first request comprises:
 receiving the first request from the first device to open a first Transmission Control Protocol (TCP) connection,
 wherein the public connection address of the first device includes an Internet Protocol (IP) address of the first device and a port address of the first device,
 wherein the receiving the second request comprises:
 receiving the second request from the second device to open a second TCP connection, and
 wherein the public connection address of the second device includes an IP address of the second advice and a port address of the second device.

20. The non-transitory computer-readable medium of claim 19, wherein the operations further comprise:
 prior to the sending, sending a message to the second device with the IP address of the first device and the port address of the first device to indicate the first device has been notified to connect to the second device; and
 wherein the closing comprises:
 closing the first TCP connection and the second TCP connection to the first device and the second device, respectively,
 wherein the second device connects to the first device using the IP address of the second device and the port address of the second device.

* * * * *